(12) United States Patent
Lin

(10) Patent No.: US 7,239,899 B2
(45) Date of Patent: Jul. 3, 2007

(54) MOBILE PHONE AND MICROPHONE MODULE THEREIN

(75) Inventor: Yi Yen Lin, Taipei (TW)

(73) Assignee: BENQ Corporation, Taoyuan (TW)

( * ) Notice: Subject to any disclaimer, the term of this patent is extended or adjusted under 35 U.S.C. 154(b) by 571 days.

(21) Appl. No.: 10/738,474

(22) Filed: Dec. 17, 2003

(65) Prior Publication Data

US 2004/0132508 A1 Jul. 8, 2004

(30) Foreign Application Priority Data

Dec. 27, 2002 (TW) .............................. 91221334 U

(51) Int. Cl.
*H04M 1/00* (2006.01)
(52) U.S. Cl. .............................. 455/575.1; 379/433.03; 381/361
(58) Field of Classification Search ............. 455/575.1, 455/575.8, 90.3, 347, 348; 379/433.03; 381/361, 381/365
See application file for complete search history.

(56) References Cited

U.S. PATENT DOCUMENTS 5,722,055 A * 2/1998 Kobayashi et al. ...... 455/575.8
2002/0076041 A1* 6/2002 Hietanen ............... 379/433.03

* cited by examiner

*Primary Examiner*—Lee Nguyen
(74) *Attorney, Agent, or Firm*—Quintero Law office

(57) ABSTRACT

A mobile phone and a microphone module therein. The mobile phone includes a housing, a printed circuit board, a connector, and a microphone. The housing includes a front case. The printed circuit board is disposed in the housing, and includes a notch. The connector is fitted into the notch of the printed circuit board. The microphone is disposed in the connector in a manner such that it faces the front case.

10 Claims, 13 Drawing Sheets

432

432

432

432a — 432b

MOBILE PHONE AND MICROPHONE MODULE THEREIN

BACKGROUND OF THE INVENTION

1. Field of the Invention

The invention relates to a mobile phone and a microphone module therein; in particular, to a mobile phone with a microphone module that can reduce the size of the mobile phone.

2. Description of the Related Art

A microphone is a necessary component of a mobile phone. It is well known that the microphone is disposed in the mobile phone in a manner such that it faces the front side of the mobile phone. That is, the microphone faces the front case of the mobile phone to conveniently obtain a voice.

Referring to FIG. 1a, FIG. 1b, FIG. 1c, a conventional mobile phone 10 is shown. The mobile phone 10 includes a front case 11, a rear case 12, a printed circuit board 13, and a microphone module 14. The microphone module 14 includes a connector 141 and a microphone 142. The connector 141 includes two pads 141 electrically connected to a circuit (not shown) of the printed circuit board 13.

The connector 141 is assembled on the printed circuit board 13 by SMT (surface mounting technology). The microphone 142 is disposed in the connector 141, and is electrically connected to the connector 141 via the terminals. After the front case 11 is combined with the rear case 12, the printed circuit board 13 and the microphone module 14 are received therebetween.

It is noted that the front case 11 includes a microphone hole 111 corresponding to the microphone 142. Thus, the voice can be easily obtained by the microphone 142.

Since the microphone module 14 is assembled on the printed circuit board 13, the front case 11 is additionally formed with an enlarged portion 112 correspondent to the additional height due to the microphone module 14. The appearance of the mobile phone 10, however, may be considered aesthetically displeasing. Additionally, if the thickness of the mobile phone increases to remove the enlarged portion, the size of the mobile phone may be too large.

To improve the appearance of the front case, a conventional mobile phone with a microphone facing the rear case is provided, as shown in FIG. 2a, FIG. 2b, and FIG. 2c. The mobile phone 20 includes a front case 21, a rear case 22, a printed circuit board 23, and a microphone module 24. The microphone module 24 is disposed on the printed circuit board 23 in a manner such that it faces the rear case 22.

Use of such a design, reduces the distance between the front case 21 and the printed circuit board 23, and the appearance of the mobile phone 20 may be considered more appealing. However, since the microphone module 24 does not face the front case 21, it does not directly correspond to a microphone hole 211 of the front case 21. Thus, a tube 25 is additionally disposed between the microphone module 24 and the microphone hole 211 to introduce the voice obtained from the microphone hole 211 to the microphone module 24. In comparison with the quality of the voice obtained by the mobile phone 10, with the microphone module facing the front case, the quality of the voice obtained by the mobile phone 20 is, however, worse.

Since the microphone module facing the rear case cannot obtain the voice properly, another conventional mobile phone with a microphone facing the front case is provided, as shown in FIG. 3a, FIG. 3b, and FIG. 3c. The mobile phone 30 includes a front case 31, a rear case 32, a printed circuit board 33, and a microphone 34. In the mobile phone 30, the microphone 34 is directly assembled on the printed circuit board 33 without a connector. Thus, a distance between the front case 31 and the printed circuit board 33 is reduced.

However, since the connector is omitted, the microphone must be manually welded to the printed circuit board via a lead wire or a flexible printed circuit. Thus, the microphone cannot be assembled on the printed circuit board by SMT, and the mobile phone cannot be rapidly assembled by automation.

SUMMARY OF THE INVENTION

In view of this, the invention provides a mobile phone with a microphone module that reduces the size of the mobile phone while maintaining the convenience of the assembly.

Accordingly, the invention provides a mobile phone. The mobile phone includes a housing, a printed circuit board, a connector, and a microphone. The housing includes a front case. The printed circuit board is disposed in the housing, and includes a notch. The connector is fitted into the notch of the printed circuit board. The microphone is disposed in the connector in a manner such that it faces the front case.

In a preferred embodiment, the connector includes a pad abutted by a surface, facing the front case, of the printed circuit board, and the printed circuit board includes a circuit electrically connected to the pad.

Furthermore, the pad is located near an end, facing the front case, of the connector.

In another preferred embodiment, the connector includes a first terminal and a second terminal, and the microphone includes a third terminal corresponding to the first terminal and a fourth terminal corresponding to the second terminal. Thus, the microphone is electrically connected to the connector by the first terminal contacting the third terminal and the second terminal contacting the fourth terminal.

Furthermore, both the first terminal and the second terminal are elastic members.

In another preferred embodiment, the front case includes a microphone hole corresponding to the microphone.

In another preferred embodiment, the housing further includes a rear case combined with the front case, and the printed circuit board, the microphone, and the connector are surrounded by the front case and the rear case.

In another preferred embodiment, the microphone is abutted by the front case.

In this invention, a microphone module for a mobile phone is provided. The mobile phone includes a printed circuit board and a front case, and the microphone module includes a connector and a microphone. The connector is fitted into the printed circuit board. The microphone is disposed in the connector in a manner such that it faces the front case.

In this invention, another mobile phone is provided. The mobile phone includes a housing, a printed circuit board, and a microphone. The housing includes a front case. The printed circuit board is disposed in the housing, and includes a notch. The microphone is fitted into the notch of the printed circuit board in a manner such that it faces the front case.

In this invention, an electronic device is provided. The electronic device includes a housing, a printed circuit board, a connector, a microphone. The housing includes a front case, and the printed circuit board is disposed in the housing.

The connector is fitted into the printed circuit board, and the microphone is disposed in the connector in a manner such that it faces the front case.

BRIEF DESCRIPTION OF THE DRAWINGS

The present invention can be more fully understood by reading the subsequent detailed description and examples with references made to the accompanying drawings, wherein:

FIG. 1b is a schematic view of the assembled mobile phone in FIG. 1a;

FIG. 2b is a schematic view of the assembled mobile phone in FIG. 2a;

FIG. 3b is a schematic view of the assembled mobile phone in FIG. 3a;

FIG. 4b is a schematic view of the assembled mobile phone in FIG. 4a;

FIG. 5a is a top view of a microphone in FIG. 4a;

FIG. 5b is a side view of a microphone in FIG. 4a;

FIG. 5c is a bottom view of a microphone in FIG. 4a;

FIG. 6a is a perspective view of a connector in FIG. 4a;

FIG. 6b is a top view of a connector in FIG. 4a;

FIG. 6c is a side view of a connector in FIG. 4a;

FIG. 6d is a bottom view of a connector in FIG. 4a;

FIG. 7b is a schematic view of the assembled mobile phone in FIG. 7a; and

DETAILED DESCRIPTION OF THE INVENTION

Embodiment 1

Figure 4A:
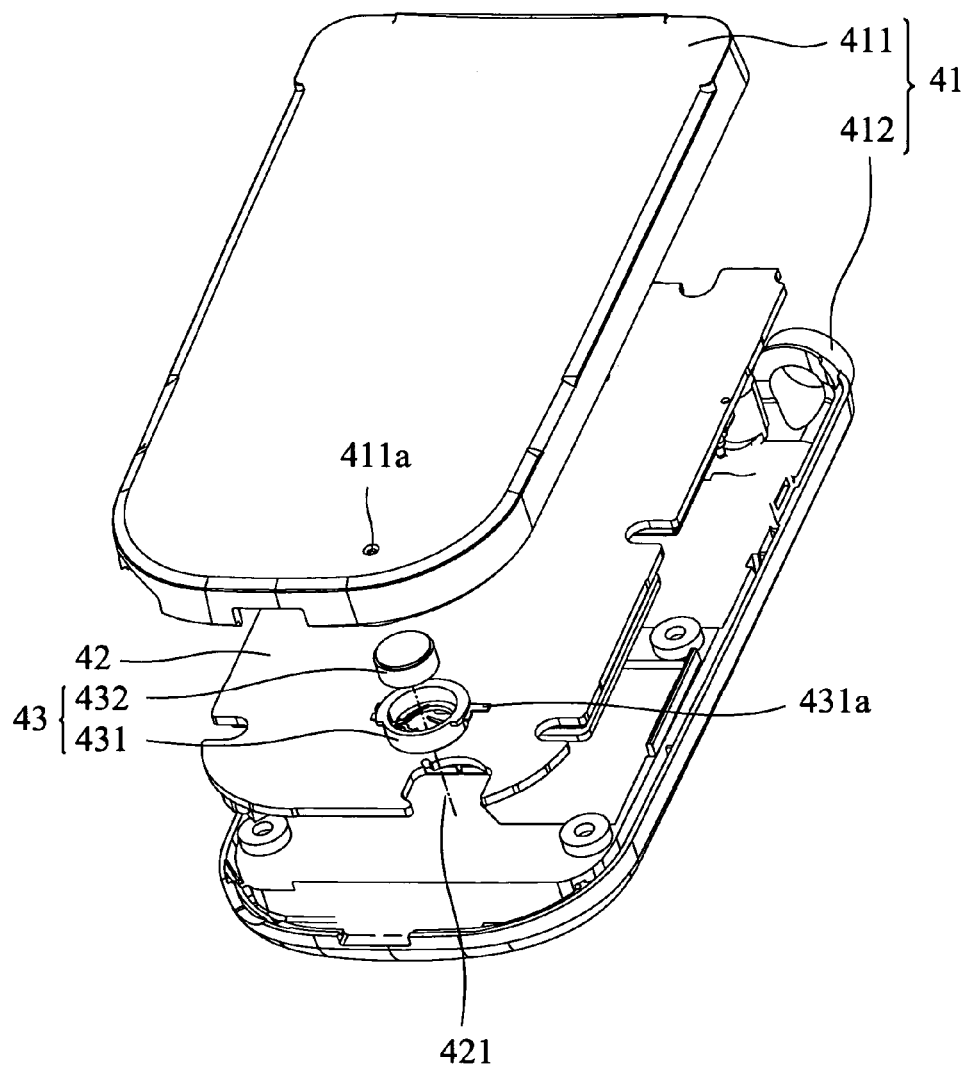
FIG. 4a is a schematic view of a mobile phone as disclosed in a first embodiment of this invention.
Figure 4B:
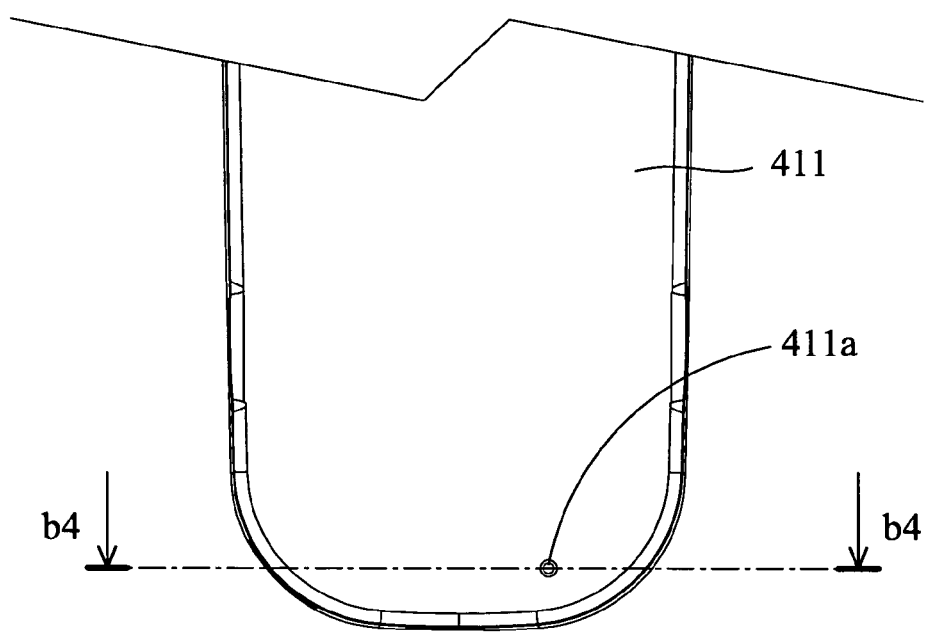
Figure 4C:
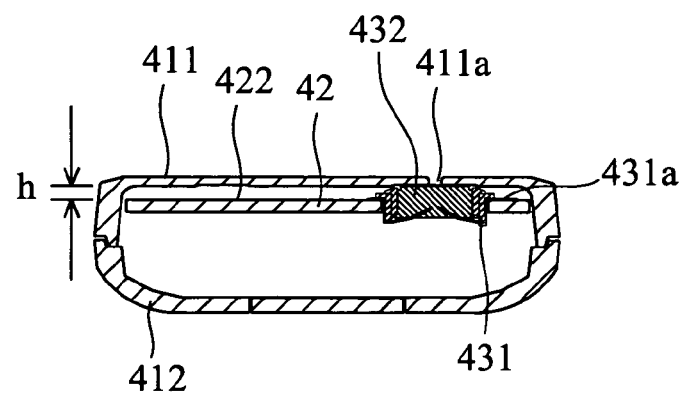
FIG. 4c is a cross section along a line b4-b4 in FIG. 4b.

Referring to FIG. 4a, FIG. 4b, and FIG. 4c, a mobile phone 40 as disclosed in a first embodiment of this invention is shown. In this embodiment, the mobile phone 40 includes a housing 41, a printed circuit board 42, and a microphone module 43.

The housing 41 includes a front case 411 and a rear case 412. The front case 411 includes a microphone hole 411a to assist in obtaining a voice. The rear case 412 is combined with the front case 411 so that the printed circuit board 42 and the microphone module 43 are surrounded by the front case 411 and the rear case 412.

The printed circuit board 42 is disposed in the housing 41, and includes a notch 421 at one side for the microphone module 43 to be fitted into.

The microphone module 43 includes a connector 431 and a microphone 432. The connector 431 is fitted into the notch 421 of the printed circuit board 42. The connector 431 includes two pads 431a at its periphery. Specifically, each of the pads 431a is located near an end, facing the front case 411, of the connector 431. As shown in FIG. 4c, the pads 431 are abutted by a surface 422, facing the front case 411, of the printed circuit board 42. Also, the printed circuit board 42 includes a circuit (not shown) electrically connected to the pads 431a. Furthermore, referring to FIGS. 6a-6e, the connector 431 includes a first terminal 431b and a second terminal 431c therein. It is understood that both the first terminal 431b and the second terminal 431c may be elastic members.

Figure 1A:
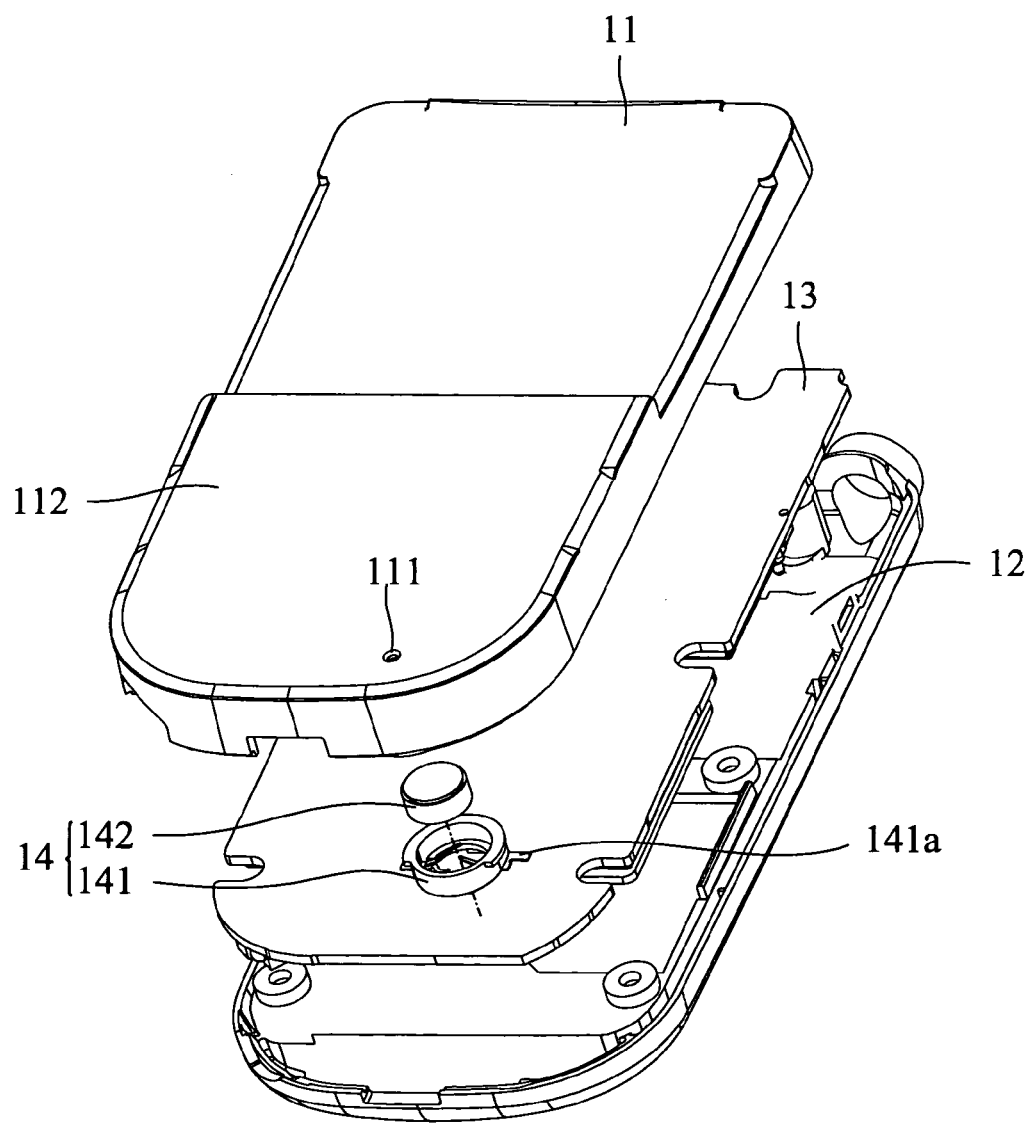
FIG. 1a is a schematic view of a conventional mobile phone.
Figure 1B:
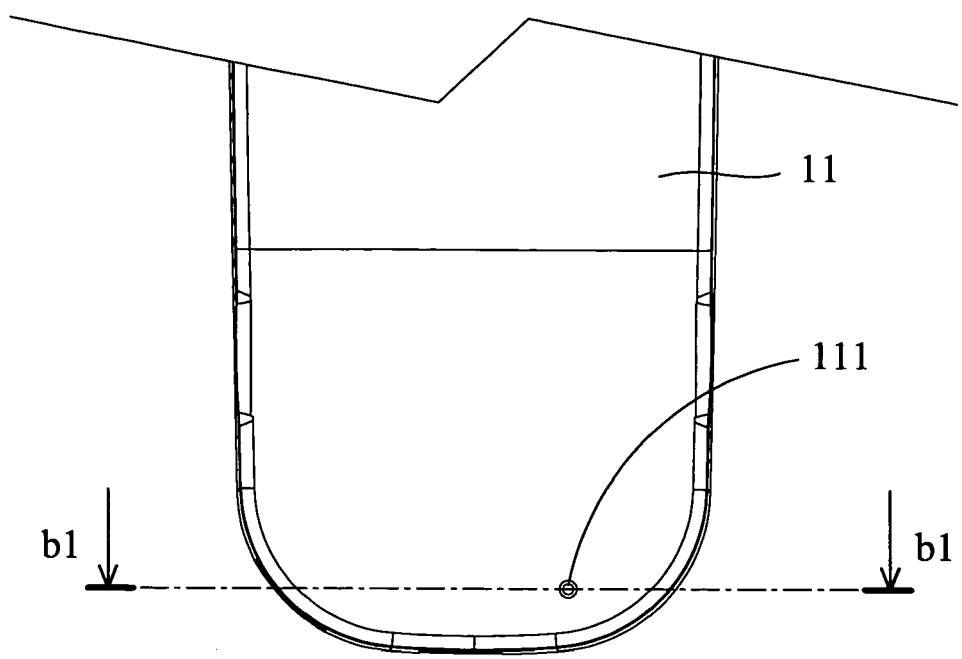
Figure 1C:
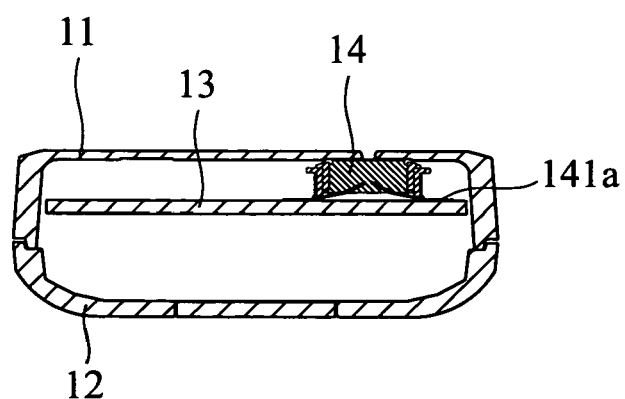
FIG. 1c is a cross section along a line b1-b1 in FIG. 1b.
Figure 2A:
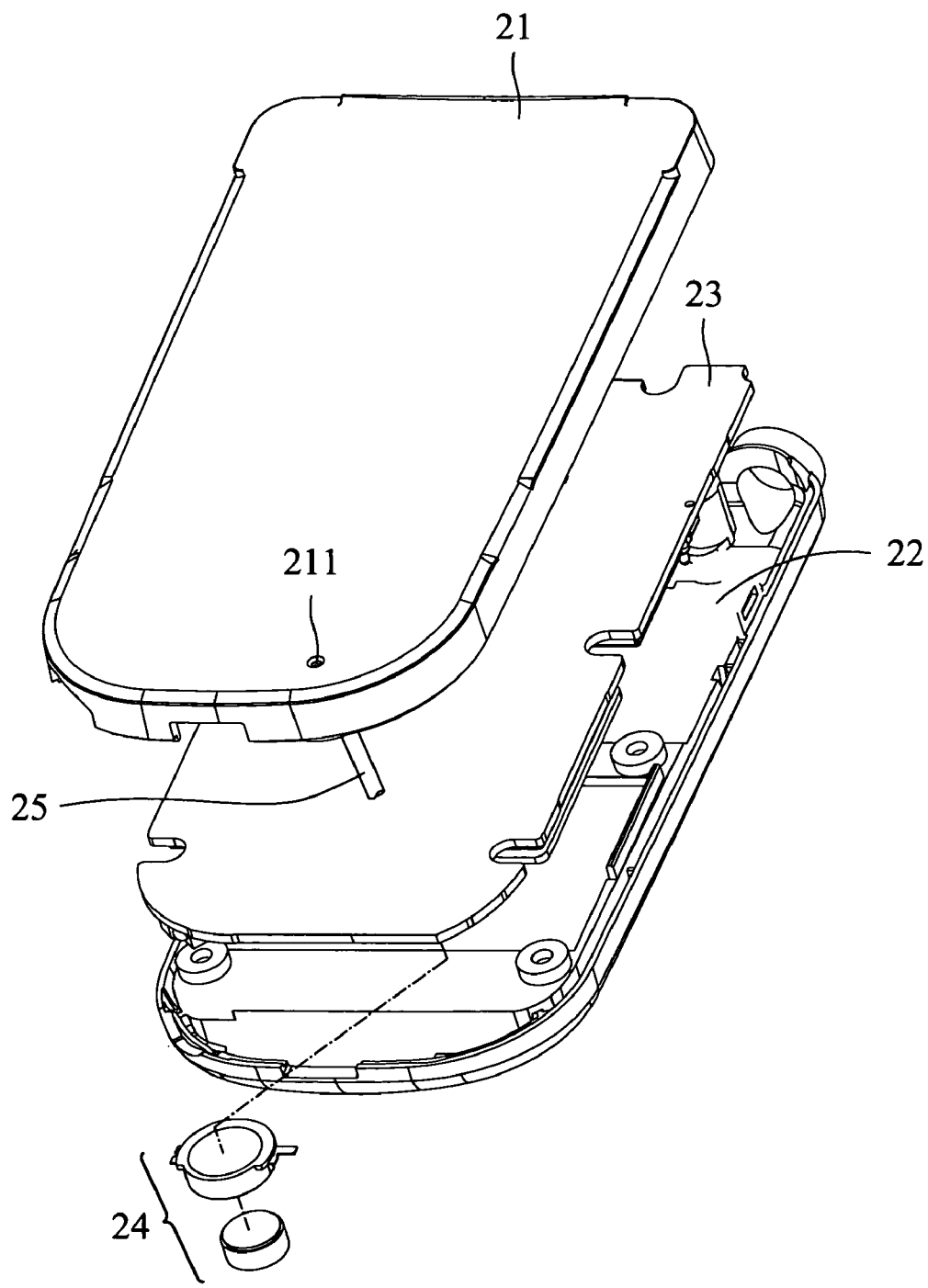
FIG. 2a is a schematic view of another conventional mobile phone.
Figure 2B:
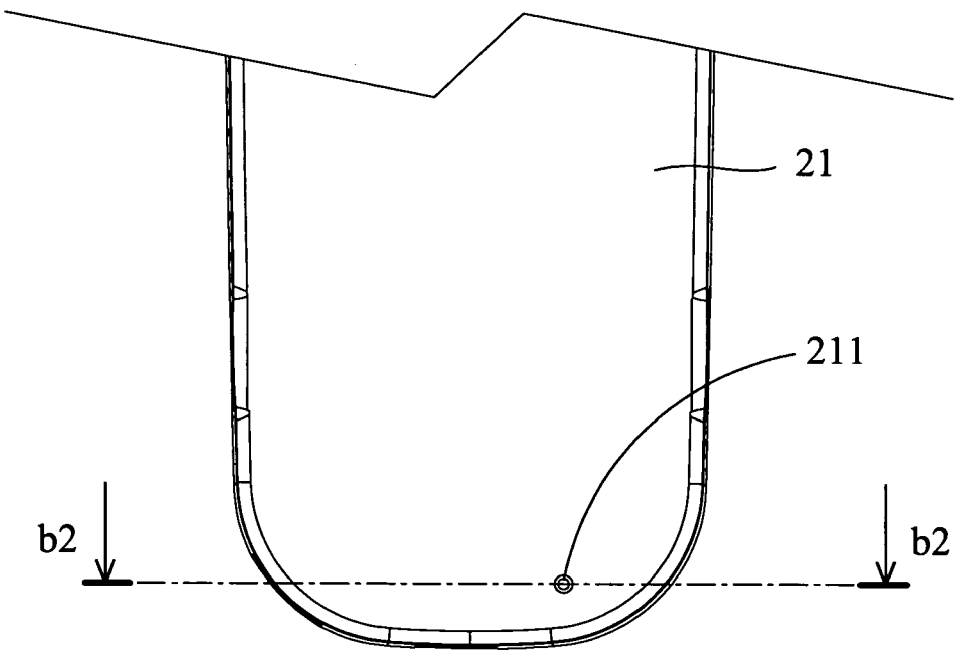
Figure 2C:
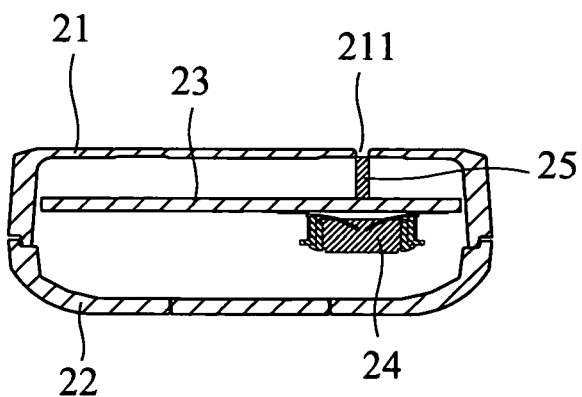
FIG. 2c is a cross section along a line b2-b2 in FIG. 2b.
Figure 3A:
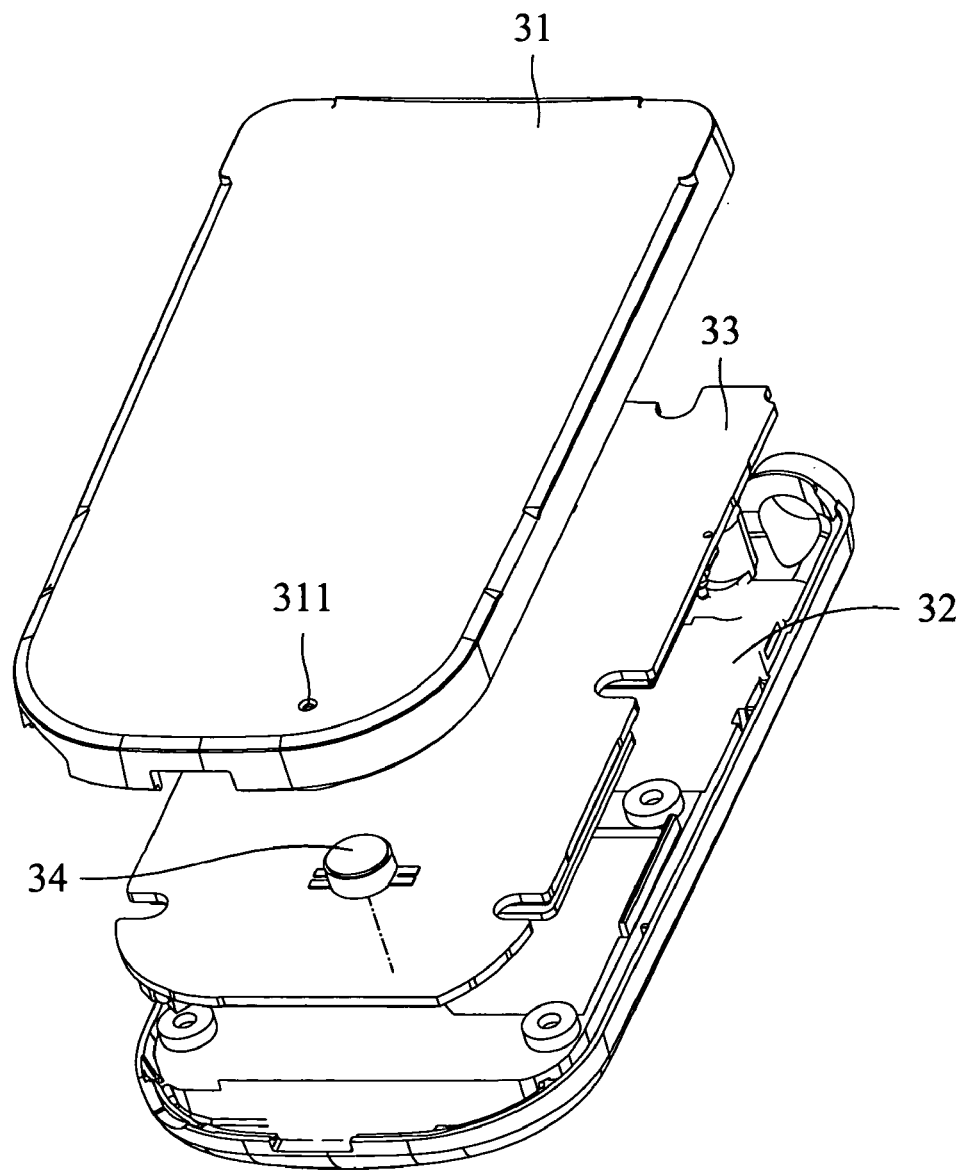
FIG. 3a is a schematic view of a conventional mobile phone.
Figure 3B:
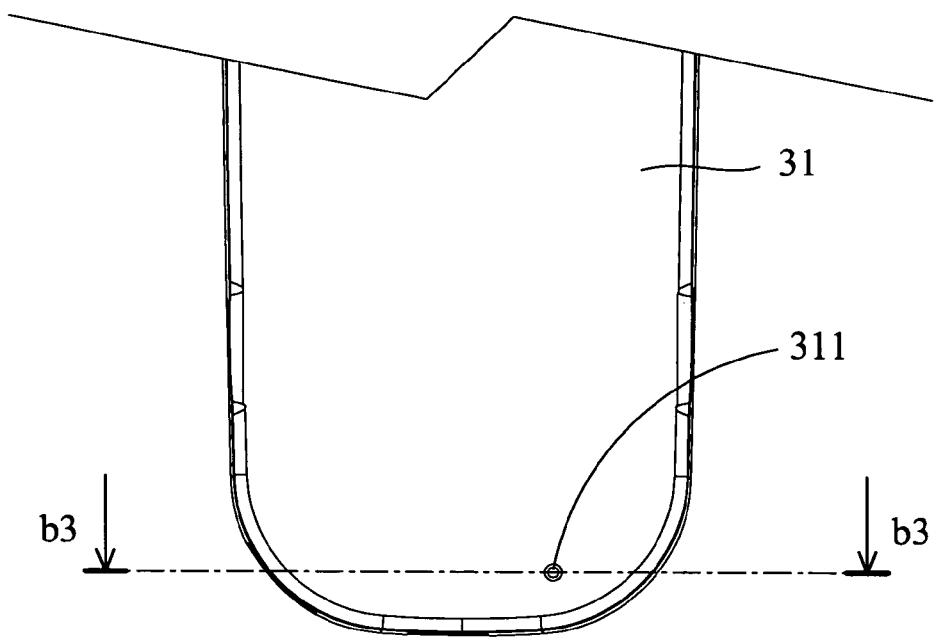
Figure 3C:
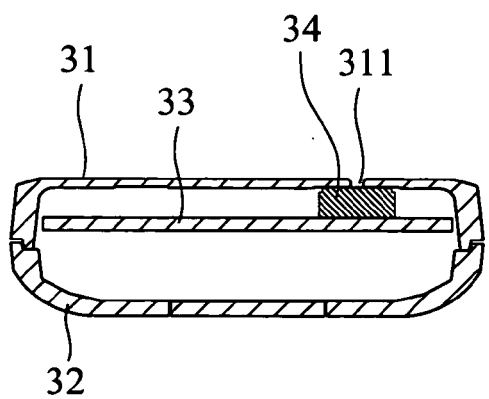
FIG. 3c is a cross section along a line b3-b3 in FIG. 3b.

In addition, in comparison with the position of each of the pads 141a of the connector 141 in FIG. 1a, the position of each of the pads 431a in this embodiment is near the top portion of the connector 431 since the connector 431 is fitted into the notch 421 of the printed circuit board 42.

Figure 5A:
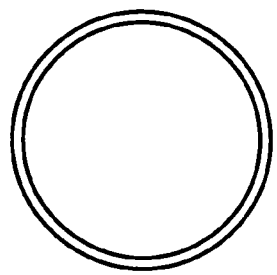
Figure 5B:
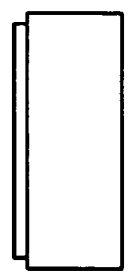
Figure 5C:
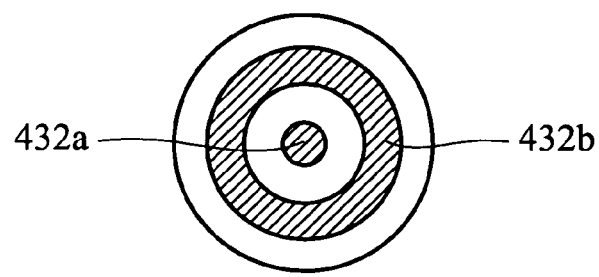
Figure 6A:
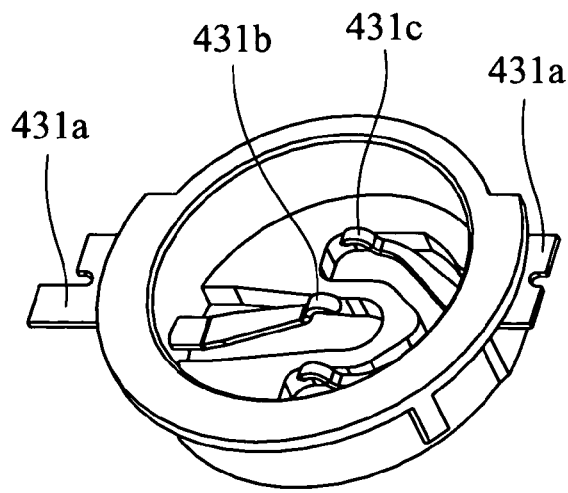
Figure 6B:
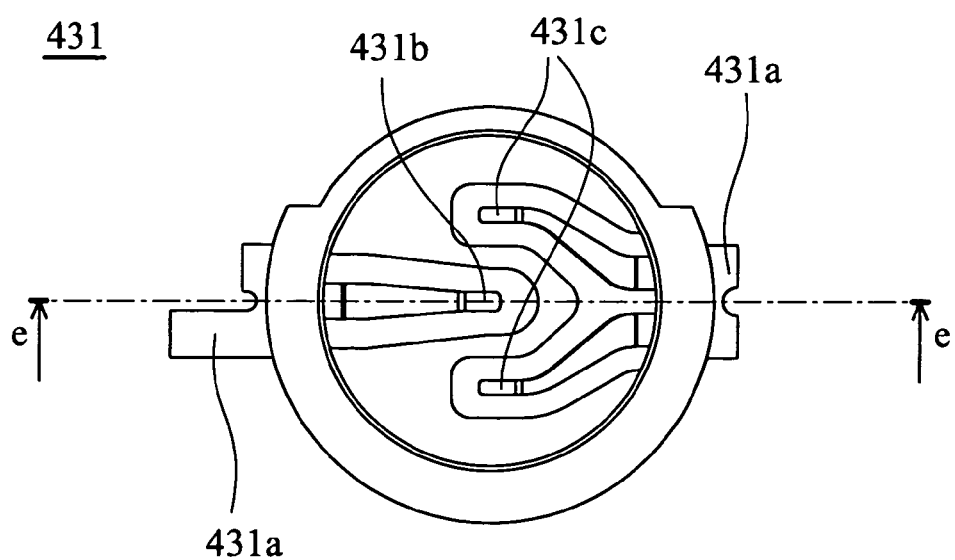
Figure 6C:
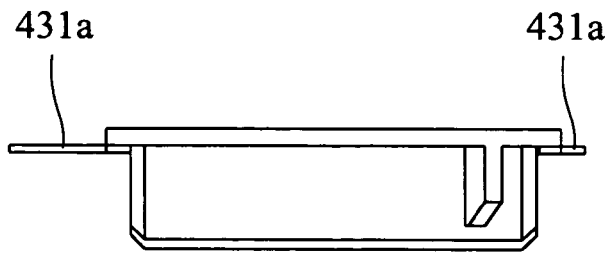
Figure 6D:
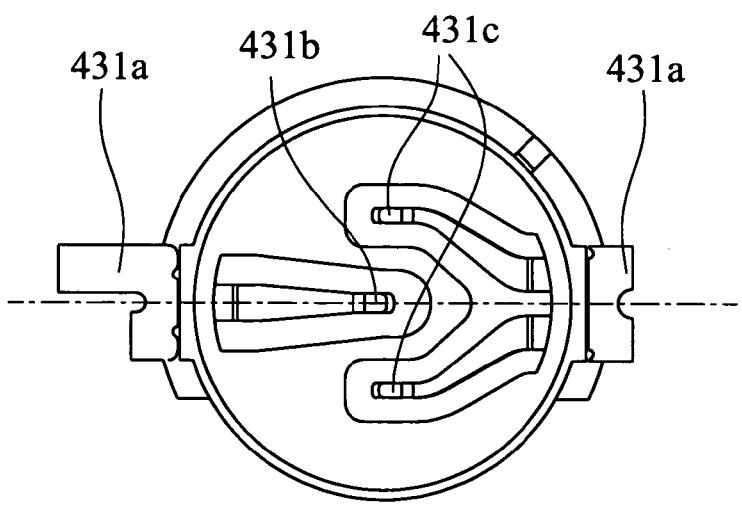
Figure 6E:
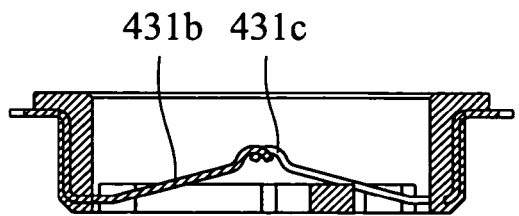
FIG. 6e is a cross section along a line e-e in FIG. 6b.

As shown in FIG. 4a and FIG. 4c, the microphone 432 is disposed in the connector 431 in a manner such that it faces the front case 411. Furthermore, referring to FIGS. 5a-5c, the microphone 432 includes a third terminal 432a corresponding to the first terminal 431b and a fourth terminal 432b corresponding to the second terminal 431c. Thus, the microphone 432 is electrically connected to the connector 431 by the first terminal 431b contacting the third terminal 432a and the second terminal 431c contacting the fourth terminal 432b. In addition, as shown in FIG. 4c, the microphone 432 may be abutted by the front case 411 so as to enhance the quality of the obtained voice.

The structure of the mobile phone of this embodiment is described as above. Since the microphone 432 is electrically connected with the printed circuit board 42 via the connector 431, the mobile phone can be automatically assembled by SMT.

Furthermore, since the connector 431 is fitted into the notch 421 of the printed circuit board 42, the thickness of the connector 431 can be partially overlapped with that of the printed circuit board 42 after assembly. Thus, a distance h between the front case 411 and the printed circuit board 42 can be largely reduced.

In addition, since the microphone faces the front case to directly face the voice source, the quality of the obtained voice is maintained.

Embodiment 2

Figure 7A:
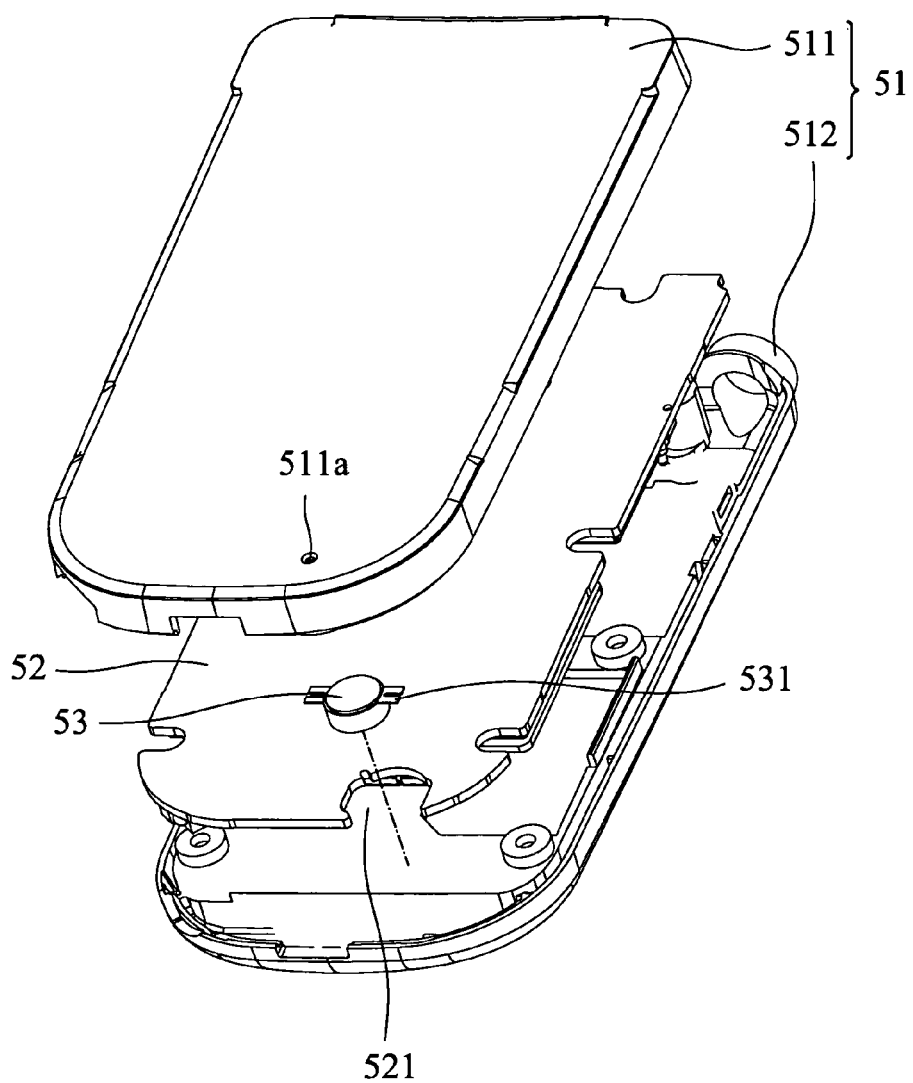
FIG. 7a is a schematic view of a mobile phone as disclosed in a second embodiment of this invention.
Figure 7B:
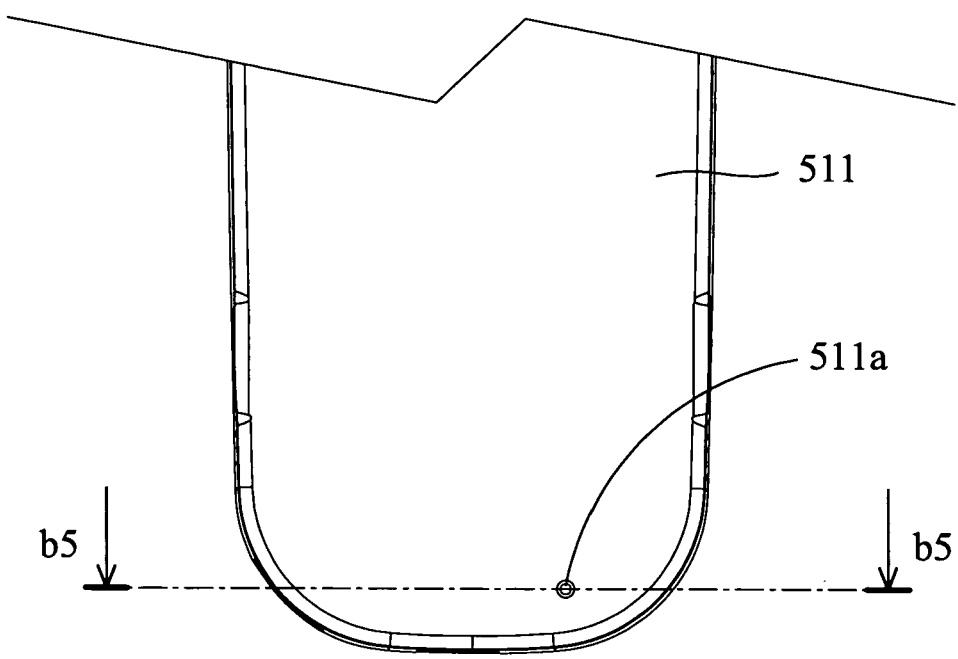
Figure 7C:
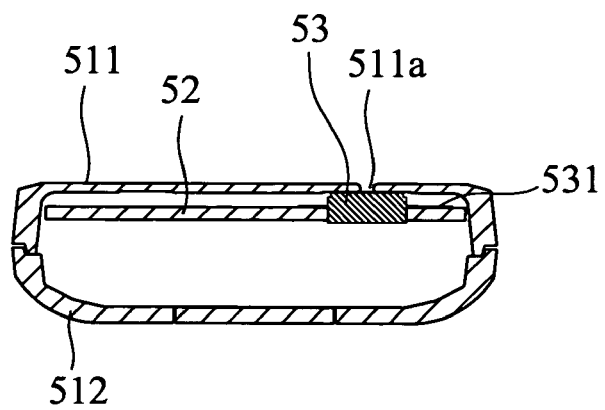
FIG. 7c is a cross section along a line b5-b5 in FIG. 7b.

Referring to FIG. 7a, FIG. 7b and FIG. 7c, a mobile phone 50 as disclosed in a second embodiment of this invention is shown. In this embodiment, the mobile phone 50 includes a housing 51, a printed circuit board 52, and a microphone 53.

The housing 51 includes a front case 511 and a rear case 512. The front case 511 includes a microphone hole 511a to assist in the voice-obtaining. The rear case 512 is combined with the front case 511 so that the printed circuit board 52 and the microphone 53 are surrounded by the front case 511 and the rear case 512.

The printed circuit board 52 is disposed in the housing 51, and includes a notch 521 at one side for the microphone 53 to be fitted into.

In this embodiment, the microphone 53 is directly fitted into the notch 521 of the printed circuit board 52 without the connector as disclosed in the first embodiment. The microphone 53 includes two pads 531 at its periphery. As shown in FIG. 7c, the pads 531 are abutted by a surface 522, facing the front case 511, of the printed circuit board 52. Also, the printed circuit board 52 includes a circuit (not shown) electrically connected to the pads 531.

The structure of the mobile phone in this embodiment is described as above. Since the microphone 53 is electrically connected to the printed circuit board 52 via the pad 531, the mobile phone can be automatically assembled by SMT. It is noted that the microphone used in this embodiment must be provided the ability to endure high temperature during the SMT process so that the microphone operates normally after the SMT process.

Furthermore, since the microphone 53 is fitted into the notch 521 of the printed circuit board 52, the thickness of the microphone 53 can be partially overlapped with that of the printed circuit board 52 after assembly. Thus, a distance between the front case 511 and the printed circuit board 52 can be largely reduced.

In addition, since the microphone faces the front case to directly face the voice source, the quality of the obtained voice is maintained.

It is understood that the design of this invention is not limited to the mobile phone, and it can be also applied to an electronic device with a microphone.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
   a housing including a front case;
   a printed circuit board, disposed in the housing, including a notch;
   a connector, fitted into the notch of the printed circuit board, comprising a first terminal and a second terminal; and
   a microphone, disposed in the connector in a manner such that the microphone faces the front case, wherein the microphone includes a third terminal corresponding to the first terminal and a fourth terminal corresponding to the second terminal, whereby the microphone is electrically connected to the connector by the first terminal contacting the third terminal and the second terminal contacting the fourth terminal.

2. The mobile phone as claimed in claim 1, wherein the connector includes a pad abutted by a surface, facing the front case, of the printed circuit board, and the printed circuit board includes a circuit electrically connected to the pad.

3. The mobile phone as claimed in claim 2, wherein the pad is located near an end, facing the front case, of the connector.

4. The mobile phone as claimed in claim 1, wherein both the first terminal and the second terminal are elastic members.

5. The mobile phone as claimed in claim 1, wherein the front case includes a microphone hole corresponding to the microphone.

6. The mobile phone as claimed in claim 1, wherein the housing further includes a rear case combined with the front case, and the printed circuit board, the microphone, and the connector are surrounded by the front case and the rear case.

7. The mobile phone as claimed in claim 1, wherein the microphone is abutted by the front case.

8. A microphone module for a mobile phone, wherein the mobile phone comprises a printed circuit board and a front case, and the microphone module comprises:
   a connector, fitted into the printed circuit board, comprising a first terminal and a second terminal; and
   a microphone disposed in the connector in a manner such that the microphone faces the front case, wherein the microphone includes a third terminal corresponding to the first terminal and a fourth terminal corresponding to the second terminal, whereby the microphone is electrically connected to the connector by the first terminal contacting the third terminal and the second terminal contacting the fourth terminal.

9. The microphone module as claimed in claim 8, wherein the connector includes a pad abutted by a surface, facing the front case, of the printed circuit board, and the printed circuit board includes a circuit electrically connected to the pad.

10. The microphone module as claimed in claim 9, wherein the pad is located near an end, facing the front case, of the connector.

* * * * *